(12) United States Patent
Mukherjee et al.

(10) Patent No.: US 11,379,368 B1
(45) Date of Patent: Jul. 5, 2022

(54) EXTERNAL WAY ALLOCATION CIRCUITRY FOR PROCESSOR CORES

(71) Applicant: Marvell Asia Pte, Ltd., Singapore (SG)

(72) Inventors: Shubhendu Sekhar Mukherjee, Southborough, MA (US); Thomas F. Hummel, Holliston, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 35 days.

(21) Appl. No.: 17/081,151

(22) Filed: Oct. 27, 2020

Related U.S. Application Data (60) Provisional application No. 62/944,278, filed on Dec. 5, 2019.

(51) Int. Cl.
*G06F 12/08* (2016.01)
*G06F 12/0802* (2016.01)
*G06F 9/50* (2006.01)

(52) U.S. Cl.
CPC ........ *G06F 12/0802* (2013.01); *G06F 9/5016* (2013.01); *G06F 2212/62* (2013.01)

(58) Field of Classification Search
CPC . G06F 2212/62; G06F 12/0802; G06F 9/5016
USPC ...................................................... 711/130
See application file for complete search history.

(56) References Cited

U.S. PATENT DOCUMENTS

| 6,629,209 | B1 | 9/2003 | Arimilli et al. |
|---|---|---|---|
| 8,347,034 | B1 | 1/2013 | Chen et al. |
| 8,745,618 | B2 | 6/2014 | Lin et al. |
| 8,943,273 | B1 | 1/2015 | Jamil et al. |
| 9,015,351 | B1 | 4/2015 | Geddes et al. |
| 9,379,992 | B2 | 6/2016 | Snyder, II et al. |
| 10,282,299 | B2 | 5/2019 | Mukherjee et al. |
| 11,036,643 | B1* | 6/2021 | Asher et al. |
| 11,093,405 | B1* | 8/2021 | Mukherjee et al. |
| 2004/0117558 | A1 | 6/2004 | Krick et al. |
| 2010/0169582 | A1 | 7/2010 | Hinton et al. |
| 2011/0010503 | A1 | 1/2011 | Yamamura et al. |
| 2014/0032829 | A1 | 1/2014 | Solihin |
| 2014/0032854 | A1 | 1/2014 | Lih et al. |
| 2015/0032962 | A1 | 1/2015 | Buyuktosunoglu et al. |
| 2015/0067264 | A1 | 3/2015 | Eckert et al. |
| 2016/0335190 | A1 | 11/2016 | Li et al. |
| 2016/0350229 | A1 | 12/2016 | Reed |
| 2018/0373635 | A1* | 12/2018 | Mukherjee et al. |

(Continued)

OTHER PUBLICATIONS

Corresponding U.S. Appl. No. 17/081,140, filed Oct. 27, 2020.
Mohammad, Baker, Embedded Memory Design for Multi-Core and Systems on Chip. Springer (2014).

*Primary Examiner* — Hua J Song
(74) *Attorney, Agent, or Firm* — Young Basile Hanlon & MacFarlane, P.C.

(57) ABSTRACT

An apparatus includes a plurality of processor cores; a shared cache connected to the plurality of processor cores; a cache control unit connected to the shared cache; and a way allocation circuitry connected to at least one of the plurality of processor cores. The way allocation circuitry is external to the plurality of processor cores. The cache control unit and the way allocation circuitry are cooperatively configured to process an intercepted memory request with respect to designated ways in the shared cache, the designated ways being based on a partition identifier and a partition table.

22 Claims, 5 Drawing Sheets

(56) References Cited

U.S. PATENT DOCUMENTS

2019/0018777 A1\* 1/2019 Swaine
2020/0293318 A1 9/2020 Snyder, II et al.

\* cited by examiner

EXTERNAL WAY ALLOCATION CIRCUITRY FOR PROCESSOR CORES

CROSS-REFERENCE TO RELATED APPLICATION(S)

This application claims priority to and the benefit of U.S. Provisional Application Patent Ser. No. 62/944,278, filed Dec. 5, 2019, the entire disclosure of which is hereby incorporated by reference.

TECHNICAL FIELD

This disclosure relates to shared cache management, and in particular, providing way allocation circuitry for processor cores lacking hardware to support way allocation.

BACKGROUND

Many modern processors support hierarchical cache systems with multiple levels of cache, including one or more levels within the processor or within each core of a multi-core processor, and one or more levels external to the processor or cores, up to a last level cache (LLC) that is accessed just before main memory is accessed. Lower level caches are closer to the processor (or core), whereas higher level caches are further away from the processor (or core). At each level, the cache system will load blocks of data into entries and evict blocks of data from entries in units of cache blocks. The LLC is typically shared by all of the cores of a multi-core processor. Multiple processes or virtual machines running on these different cores might result in memory thrashing in the LLC. Way allocation is a mechanism to prevent thrashing and provide a more equitable allocation of the LLC.

Way allocation or partitioning allocates ways in an n-way set associative cache (e.g., a shared LLC), so that different processes (or other entities) can be assigned different (potentially overlapping) sections of the cache. Some implementations of way allocation use support from the shared cache and the multi-core processor. For example, the shared cache can support way allocation by maintaining a partition identifier table which maps partition identifiers to certain ways in the shared cache. Depending on the way allocation policy, software running on the multi-core processor or the operating system may configure the partition identifier table based on user allocation requests, pre-allocation at initialization, or combinations thereof. The multi-core processor can support way allocation by storing partition identifiers in core control registers. A partition identifier is then attached to each memory request sent by a core. The shared memory can then determine the ways associated with the core using the partition identifier table.

SUMMARY

In one aspect, in general, a method for memory management includes: sending a memory request from a requesting entity, the requesting entity associated with at least one processor core of a plurality of processor cores that have access to a shared cache; intercepting the memory request, by a way allocation circuitry, prior to processing at the shared cache in the event the memory request misses all applicable intervening caches, the way allocation circuitry external to the plurality of processor cores; reading from a partition storage, by the way allocation circuitry, a partition identifier for the requesting entity, the partition storage located with the way allocation circuitry; attaching, by the way allocation circuitry, the partition identifier to the memory request; sending, by the way allocation circuitry, the memory request with the attached partition identifier to a cache control unit associated with the shared cache; determining, by the cache control unit from a partition information table, designated ways in the shared cache based on the partition identifier; and processing the memory request with respect to the determined designated ways in the shared cache.

Aspects can include one or more of the following features.

The requesting entity is at least one of the at least one processor core or a process running on the at least one processor core.

Each requesting entity has a partition identifier.

The partition storage is populated with partition identifiers by at least one instruction executed within a pipeline associated with the requesting entity, the instruction addressing a portion of an address space reserved for accessing the partition storage.

The partition information table is populated with at least partition identifiers and designated ways by the instruction.

The instruction populates the partition storage and the partition information table at initialization.

The instruction updates the partition storage and the partition information table at defined events.

The partition identifier is an index in the partition information table.

Each processor core has an associated way allocation circuitry.

The way allocation circuitry is shared by the plurality of processor cores.

The way allocation circuitry is on a die separate from a processor core die.

The way allocation circuitry is on a chip separate from a processor core chip.

In another aspect, in general, an apparatus includes: a plurality of processor cores; a shared cache connected to the plurality of processor cores; a cache control unit connected to the shared cache; and a way allocation circuitry connected to at least one of the plurality of processor cores, the way allocation circuitry external to the plurality of processor cores, the cache control unit and the way allocation circuitry cooperatively configured to process an intercepted memory request with respect to designated ways in the shared cache, the designated ways being based on a partition identifier and a partition table.

Aspects can include one or more of the following features.

The way allocation circuitry is further configured to intercept a memory request prior to processing at the shared cache when the memory request misses all applicable intervening caches, the memory request sent by a requesting entity associated with at least one processor core of the plurality of processor cores and wherein the requesting entity is at least one of the at least one processor core or a process running on the at least one processor core.

Each requesting entity has a partition identifier.

A partition storage is populated with partition identifiers by one of a software or an operating system and wherein the partition information table is populated with at least partition identifiers and designated ways by the one of a software or an operating system.

The one of a software or an operating system populates the partition storage and the partition information table at initialization and wherein the one of a software or an operating system updates the partition storage and the partition information table at defined events.

The partition identifier is an index in the partition information table.

Each processor core has an associated way allocation circuitry.

The way allocation circuitry is on a die separate from a processor core die.

In another aspect, in general, an apparatus includes: a plurality of processor cores; a shared cache connected to the plurality of processor cores; a cache control unit connected to the shared cache; and a way allocation circuitry connected to at least one of the plurality of processor cores, the way allocation circuitry external to the plurality of processor cores, the cache control unit and the way allocation circuitry cooperatively configured to: intercept a memory request prior to processing at the shared cache when the memory request misses all applicable intervening caches, the memory request sent by a requesting entity associated with at least one processor core of the plurality of processor cores; read from a partition storage a partition identifier for the requesting entity, the partition storage located with the way allocation circuitry; attach the partition identifier to the memory request; and send the memory request with the attached partition identifier to the cache control unit; and the cache control unit configured to: determine from a partition information table, designated ways in the shared cache based on the partition identifier; and process the memory request with respect to the determined designated ways in the shared cache.

In another aspect, in general, an apparatus includes: a plurality of processor cores; a shared cache connected to the plurality of processor cores; means for cache control connected to the shared cache; and means for way allocation connected to at least one of the plurality of processor cores, the means for way allocation external to the plurality of processor cores, the means for cache control and the means for way allocation cooperatively configured to process an intercepted memory request with respect to designated ways in the shared cache, the designated ways being based on a partition identifier and a partition table.

Aspects can have one or more of the following advantages.

A mechanism is provided for way allocation that can be efficiently incorporated into various computing system configurations. For example, the techniques described herein can be used in the situation where the shared cache supports way allocation but the multi-core processor has no provisions for way allocation.

These and other aspects of this disclosure are disclosed in the following detailed description of the implementations, the appended claims and the accompanying figures.

BRIEF DESCRIPTION OF THE DRAWINGS

The disclosure is best understood from the following detailed description when read in conjunction with the accompanying drawings, wherein like reference numerals refer to like parts throughout the several views. It is emphasized that, according to common practice, the various features of the drawings are not to-scale. On the contrary, the dimensions of the various features are arbitrarily expanded or reduced for clarity.

DETAILED DESCRIPTION

Way allocation or partitioning allocates ways in an n-way set associative cache (e.g., a shared LLC), so that different processes (or other entities) can be assigned different (potentially overlapping) sections of the cache. Examples of way allocation and partitioning are disclosed in U.S. Pat. No. 10,282,299, entitled "MANAGING CACHE PARTITIONS BASED ON CACHE USAGE INFORMATION" and issued on May 7, 2019, the entire disclosure of which is hereby incorporated by reference herein (referred to herein as "patent '299").

In an illustrative example, if a new user process in a processor core is context-switched, the state information of the new user process is written into control registers in the processor core. Part of that state information can include a partition identifier (partition ID) that an operating system or other software writes into the core control register to assign one or more way(s) for use by that user process. For each memory request directed towards shared memory, the processor core reads the control register and attaches the partition ID for association with the physical address of the memory request. After the partition ID is associated with or attached to the memory request, the corresponding way(s) assigned to the processor core can be determined by a cache controller of the shared cache by looking up the partition ID in a partition ID table. In the instance when the processor core does not have control registers for storing partition IDs, this form of way allocation is not possible and increased cache thrashing may occur.

Described herein are apparatus, device, system, and methods for external way allocation circuitry for processor cores. In an implementation, a way allocation circuitry is provided for each processor core external to the processor core, i.e., outside the processor core. The external way allocation circuitry resides logically between a shared cache and each processor core. The external way allocation circuitry includes storage, for example control registers, for storing to (writing) and loading from (reading) partition IDs. The storage can be accessed using defined physical addresses within the physical address space. For example, this can be similar to accessing input/output (I/O) devices. Partition ID software or the operating system populates and updates the storage as appropriate. For example, this may be done at initialization, updating of state information during a contest switch, or other applicable events. Although the description herein discusses an external way allocation circuitry for each core, the external way allocation circuitry can be shared between the processor cores using multiplexing and similar techniques.

In an implementation, the processor core can write to the external way allocation circuitry using a store instruction or other write instruction. In the event of a memory request directed toward the shared cache, the external way allocation circuitry loads or reads the partition ID from the storage, attaches the partition ID to the memory request, and forwards the memory request and partition ID to a cache control unit associated with the shared memory.

In an implementation, the external way allocation circuitry intercepts a memory request from a processor core that is headed to shared memory due to a miss. The external way allocation circuitry reads the appropriate partition ID from the storage and sends the memory request with attached partition ID to a cache control unit. The cache control unit determines the designated ways from the shared cache based on the partition ID and processes the memory request accordingly.

Further details of techniques for external way allocation circuitry for processor cores are described herein with initial reference to a system in which they can be implemented, as shown in FIGS. 1 through 5.

Figure 1:
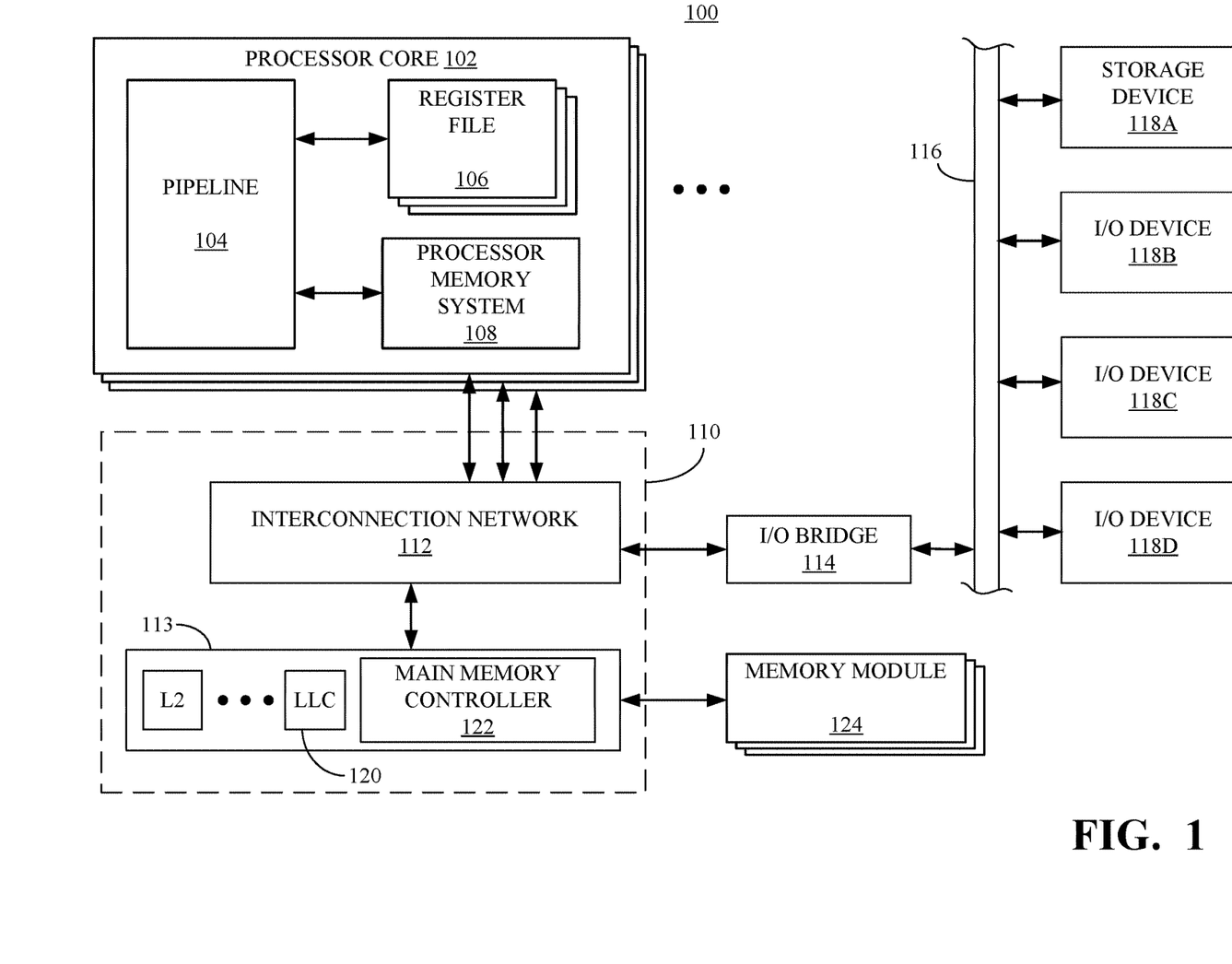
FIG. 1 is a high-level block diagram of an example of a computing system 100.

FIG. 1 is a high-level block diagram of an example of a computing system 100. The computing system 100 includes at least one processor core 102, which can be a single central processing unit (CPU) or one of multiple processor cores in a multi-core architecture. In a multi-core architecture each processor core (or simply "core") can include an individual CPU with associated circuitry. In this example of a multi-core architecture, each processor core 102 can include a pipeline 104, one or more register files 106, and a processor memory system 108. Each register file of the register files 106 can include one or more individually addressable registers.

Each processor core 102 can be connected to an uncore 110. The uncore 110 can include an interconnection network 112 and an external memory system 113. The interconnection network 112 can be a bus, a cross-bar switch, a mesh network, or some other interconnection network. The interconnection network 112 can enable communication between each processor core 102 and an external memory system 113 and/or an input/output (I/O) bridge 114.

The I/O bridge 114 can enable communication, such as over an I/O bus 116, with various different I/O devices including a storage device 118A and other I/O devices 118B-118D. Non-limiting examples of the other I/O devices 118B-118D can include a network interface, a display adapter, or user input devices such as a keyboard or a mouse.

The storage device 118A can be a disk drive or some other large capacity storage device. The storage device 118A can typically be a non-volatile storage device. In some examples, the storage device 118A, or a portion thereof, can be used in a virtual memory scheme. For example, a portion of the storage device 118A can serve as secondary storage (or a 'backing store') in a virtual memory scheme for the (typically volatile and/or capacity-limited) main memory. Examples of main memory include the processor memory system 108 or an external memory system, such as described below with respect to an external memory system 113.

The processor memory system 108 and the external memory system 113 together form a hierarchical memory system. The hierarchy can include any number of levels. The levels may be denoted or referred to as L1, L2, . . . , LN. The L1 level is a lower level memory than the L2 memory system, which in turn is a lower level than the L2 memory system, and so on. Typically, each level of the hierarchical memory system can include memory (e.g., a memory system) that is slower to access than that of the immediately lower level and/or each level of the hierarchical memory system can include memory (e.g., a memory system) that is faster to access, more limited in capacity, and/or more expensive than that of a higher level. Each level of the hierarchical memory system can serve as a cache.

A first level (L1) cache can be within (e.g., a part of) the processor memory system 108. Any number of higher level (L2, L3, . . . ) caches can be within the external memory system 113. The highest (i.e., last) level cache within the external memory system 113 can be referred to as the last level cache (LLC). In an example, the LLC can be the L2 cache.

At each level, the cache can include a first module that provides an instruction cache for caching instructions and a second module that provides a data cache for caching data. The memory system of a level of the hierarchical memory system can load blocks of instructions or data into entries and evict (e.g., removes, over-writes, etc.) blocks of instructions or data from entries in units cache blocks (also called cache lines). Cache blocks are further described with respect to FIG. 3.

In addition to the L1 instruction cache and data cache, the processor memory system 108 can include a translation lookaside buffer (TLB) for caching recent translations, and various other circuitry for handling a miss in the L1 instruction or data caches or in the TLB. For example, that circuitry in the processor memory system 108 of a processor core 102 can include a write buffer for temporarily holding values to be written from a store instruction being executed within the pipeline 104. The TLB is further described with respect to FIG. 3.

As already mentioned, the highest level cache within the external memory system 113 is the LLC (such as an LLC 120). The LLC 120 can be accessed (e.g., searched, etc.) just before main memory. Of course, this is only an example. The exact division between which level caches are within the processor memory system 108 and which are in the external memory system 113 can be different in other examples. For example, the L1 cache and the L2 cache can both be internal to the processor core 102 (i.e., part of the processor memory system 108) and the L3 (and higher) caches can be external to the processor core 102.

In an example, each processor core 102 can have its own internal L1 cache, and the processor cores can share an L2 cache. The external memory system 113 can also include a main memory controller 122. The main memory controller 122 can be connected to any number of memory modules 124. Each of the memory modules 124 can serve as (e.g., can be) the main memory. In a non-limiting example, one or more of the memory modules 124 can be Dynamic Random Access Memory (DRAM) modules.

In a typical example, the content of a memory address is searched for in a level (e.g., L1) of the hierarchical memory system. If not found, then the next higher level (e.g., L2) is searched; and so on. Searching for a memory address amounts to answering the question: does this memory level of the hierarchical memory system include the content of the memory address? Or, alternatively, is the memory address cached in this memory of the hierarchical memory system?

That is, in a particular cache level of the hierarchy of the hierarchical memory system, each cache entry includes space for storing the data words of a particular memory block along with bits for determining whether a particular word from a memory block is present in that cache level (i.e., a 'hit') or not present in that cache level (i.e., a 'miss'). After a miss in one level, the cache system attempts to access (i.e., read or write) the memory block from a higher level cache, or from the main memory (in the case of a miss in the LLC).

The pipeline 104 can include multiple stages through which instructions advance, a cycle at a time. The stages can include an instruction fetch (IF) stage or stages, an instruction decode (ID) stage or stages, an operand fetch (OF) stage or stages, an instruction execution (IE) stage or stages, and/or a write back (WB) stage or stages. The pipeline can include other stages, as further described with respect to FIG. 2. Some stages occur in a front-end portion of the pipeline. Some other stages occur in a back-end portion of the pipeline. The front-end portion can include pre-execution stages. The back-end portion of the pipeline can include execution and post-execution stages. The pipeline 104 is further described with respect to FIG. 2.

First, an instruction is fetched (e.g., in the IF stage or stages). An instruction can be fetched based on a program counter (PC). The PC is a pointer that can be used to identify instructions within memory (e.g., within a portion of the main memory, or within an instruction cache of the core 102). The PC can advance through addresses of a block of compiled instructions (called a "basic block"). The PC can be incremented by a particular number of bytes. The particular number of bytes for incrementing the PC can depend on how long (e.g., in bytes) each instruction is and on how many instructions are fetched at a time.

After being fetched, the instruction is then decoded (e.g., in the ID stage or stages) to determine an operation and one or more operands. Alternatively, in some pipelines, the IF and ID stages can overlap. If the instruction includes operands, the operands are fetched (e.g., in the OF stage or stages).

The instruction is then ready to be issued. Issuing an instruction starts progression of the instruction through stages in a back-end portion of the pipeline to execute the instruction. In an example, execution of the instruction can involve applying the operation of the instruction to the operand(s) to produce a result for an arithmetic logic unit (ALU) instruction. In an example, execution of the instruction can involve storing or loading to or from a memory address for a memory instruction. In an example, execution of the instruction can involve evaluating a condition of a conditional branch instruction to determine whether or not the branch should be taken.

After an instruction has completed execution, the instruction can be committed so that any effect of the instruction is made globally visible to software. Committing an instruction may involve storing a result in a register file (e.g., in the WB stage or stages), for example. In most implementations, even if any instructions were issued out-of-order, all instructions are generally committed in-order.

Figure 2:
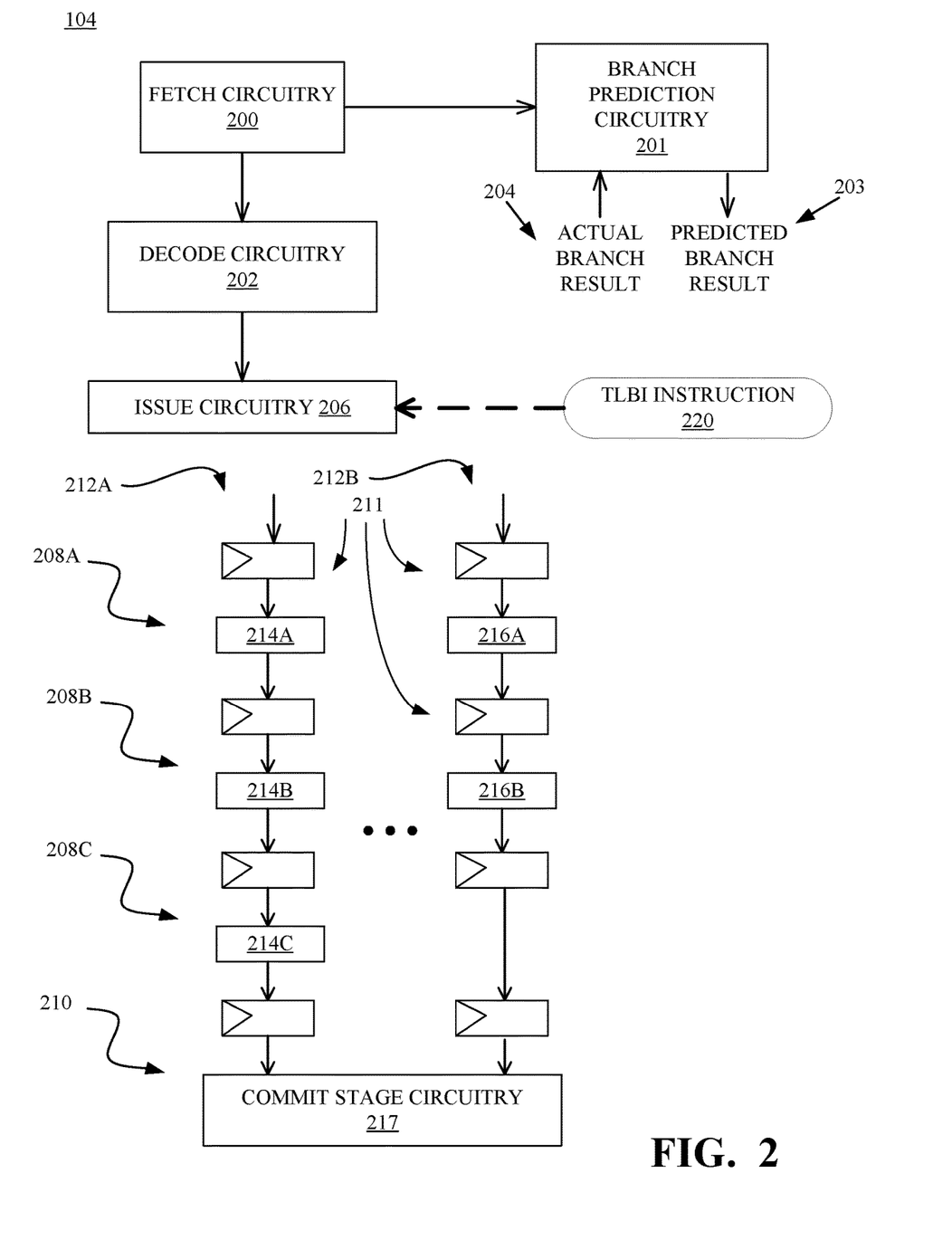
FIG. 2 is an example of a configuration of the pipeline of FIG. 1.

FIG. 2 is an example of a configuration of the pipeline 104 of FIG. 1.

The pipeline 104 can include circuitry for the various stages (e.g., the IF, ID, and OF stages). For one or more instruction fetch stages, an instruction fetch circuitry 200 provides a PC to an instruction cache in a processor memory system, such as the processor memory system 108 of FIG. 1, to fetch (e.g., retrieve, read, etc.) instructions to be fed (e.g., provided to, etc.) into the pipeline 104. For example, the PC can be a virtual address of the next instruction, in which case the PC can be incremented by the length of a virtual address in the case of sequential execution (i.e., without taking any branches). Virtual addresses are described with respect to FIG. 3.

The instruction fetch circuitry 200 can also provide the program counter, PC, to a branch prediction circuitry 201. The branch prediction circuitry 201 can be used to provide a predicted branch result 203 for branch instructions. The predicted branch result 203 enables the pipeline 104 to continue executing speculatively while an actual branch result 205 is being determined. The branch prediction circuitry 201 can also store branch history information that is updated based on receiving the actual branch result 204. In some implementations, some or all of the branch prediction circuitry 201 can be considered to be a part of the instruction fetch circuitry 200.

In an out-of-order execution, for one or more instruction decode (ID) stages, instruction decode circuitry 202 can store information in an issue queue for instructions in an instruction window waiting to be issued. The issue queue (which can also be referred to as an instruction queue) is such that an instruction in the queue can leave the queue when the operands of the instruction become available. As such, the instruction can leave before earlier (e.g., older) instructions in a program being executed. The instruction window refers to a set of instructions that can execute out-of-order.

An issue circuitry 206 can determine a respective cycle in which each of the instructions in the issue queue are to be issued. Issuing an instruction makes the instruction available to progress through circuitry of instruction execution (IE) stages, such as a first execution stage 208A, a second execution stage 208B, and a third execution stage 208C, of the pipeline 104. For simplicity of explanation, only three execution stages are illustrated in FIG. 2. However, the disclosure herein is not so limited: more or fewer execution stages are possible.

The pipeline 104 can include one more commit stages, such as a commit stage 210. A commit stage commits (e.g., writes to memory) results of instructions that have made their way through the IE states 208A, 208B, and 208C. For example, a commit stage circuitry 217 may write back a result into a register file, such as the register file 106 of FIG. 1. However, some instructions may not be committed by the commit stage circuitry 217; Instead the results of the instructions may be committed by other circuitry, such as circuitry in another stage of the back-end or a stage of the front-end, possibly based on information from the commit stage.

Between adjacent stages of the pipeline 104, the various paths through the pipeline circuitry include pipeline registers. For example, shown in FIG. 2 are pipeline registers 211 for the IE stages 208A, 208B, and 208C. The pipeline registers can be used for storing results of an upstream stage to be passed downstream to a next stage. The pipeline registers 211 may be clocked by (i.e., receive a clock signal derived from) a common clock (not shown). Thus, each clock cycle, each pipeline register 211 (also called a latch, or a set of flip-flops) can pass a result from its input to its output and becomes ready to receive a new result in its input after that result has been produced by the circuitry of that stage.

There may be multiple separate paths through the IE stages. The IE stages can include various circuitry for executing different types of instructions. For illustration purposes, only two paths 208A and 208B are shown in FIG. 2. However, the execution stages can include any number of paths with corresponding circuitry, which can be separated by pipeline registers, such as the pipeline registers 211.

The number of paths through the instruction execution stages can generally be dependent on the specific architecture. In an example, enough paths can be included such that a number of instructions up to a maximum number of instructions that can progress through the same execution stages in the same cycles. The maximum number of instructions that can progress through the same execution stages in the same cycles can be referred to as the issue width.

The number of stages that include functional circuitry for a given path may also differ. In the example of FIG. 2, a first path 212A includes functional circuitry 214A, 214B, and 214C located in the first execution stage 208A, the second execution stage 208B, and the third execution stage 208C, respectively. The second path 212B includes functional circuitry 216A and 216B located in the first execution stage 208A and the second execution stage 208B, respectively. In the second path 212B, the third execution stage 208C is a "silo stage" that passes a result along without performing further computation thereby ensuring that each path passes through the same number of stages through the pipeline.

In an example, a path can include circuitry for executing instructions using units for various operations (e.g., ALU, multiplier, floating point unit, etc.). In an example, another path can include circuitry for executing memory access instructions. The memory access instructions can include load instructions that read data values from the memory system. The memory access instructions can include store instructions to write data values to the memory system. The circuitry for executing memory access instructions can also initiate translation of virtual addresses to physical addresses, when necessary, as described in more detail below with respect to FIG. 3.

In addition to branch prediction, as described with respect to the branch prediction circuitry 201, the pipeline 104 can be configured to perform other types of speculative execution. In an example of another type of speculative execution, the pipeline 104 can be configured to reduce the chance of stalling (such as in the event of a cache miss) by prefetching. Stalling refers to the situation in which processor execution of instructions is stopped/paused.

A prefetch request can be used to preload a cache level (e.g., of a data cache) so that a future memory request is likely to hit in that cache level instead of having to access a higher cache level or a main memory. For example, a speculative memory access request can include prefetch requests that are sent to preload an instruction cache or data cache based on a predicted access pattern.

A prefetch request can be or can include a software prefetch request such that an explicit prefetch instruction that is inserted into the pipeline 104 includes a particular address to be prefetched. A prefetch request can be or can include a hardware prefetch that is performed by hardware within the processor (e.g., the processor core 102) without an explicit prefetch instruction being inserted into its pipeline (e.g., the pipeline 104).

In some cases, prefetching can include recognizing a pattern (e.g., a stream) within the memory accesses of a program, or can include speculatively performing a load instruction within a program (e.g., using a speculative address for that load instruction) before that load instruction is actually issued as part of program execution.

Various types of external instructions can be received from other processor cores. Such externally received instructions can be inserted into the pipeline 104 by the issue circuitry 206 to be handled at the appropriate stage. An example of such an externally received instruction is a TLB invalidation (TLBI) instruction 220 for invalidating entries in the TLB of that particular processor core (i.e., the receiving core). Another example of an external instruction that can be received is a GlobalSync instruction, which may be broadcast to processor cores as a side effect of a memory barrier operation performed by a processor core to ensure that the effects of any previously broadcast TLBIs have been completed. Said another way, an originating processor core that issues a broadcast TLBI instruction can subsequently issue a data synchronization barrier (DSB) instruction, which in turn causes GlobalSync instructions to be received by every other processor core. In response to the GlobalSync instruction, when a receiving processor core completes the TLBI instruction, the receiving processor core sends, or causes to be sent, an acknowledgement to the originating process core. Once the originating process core receives acknowledgements from all receiving processor cores, the originating process core can proceed with instruction execution.

Figure 3:
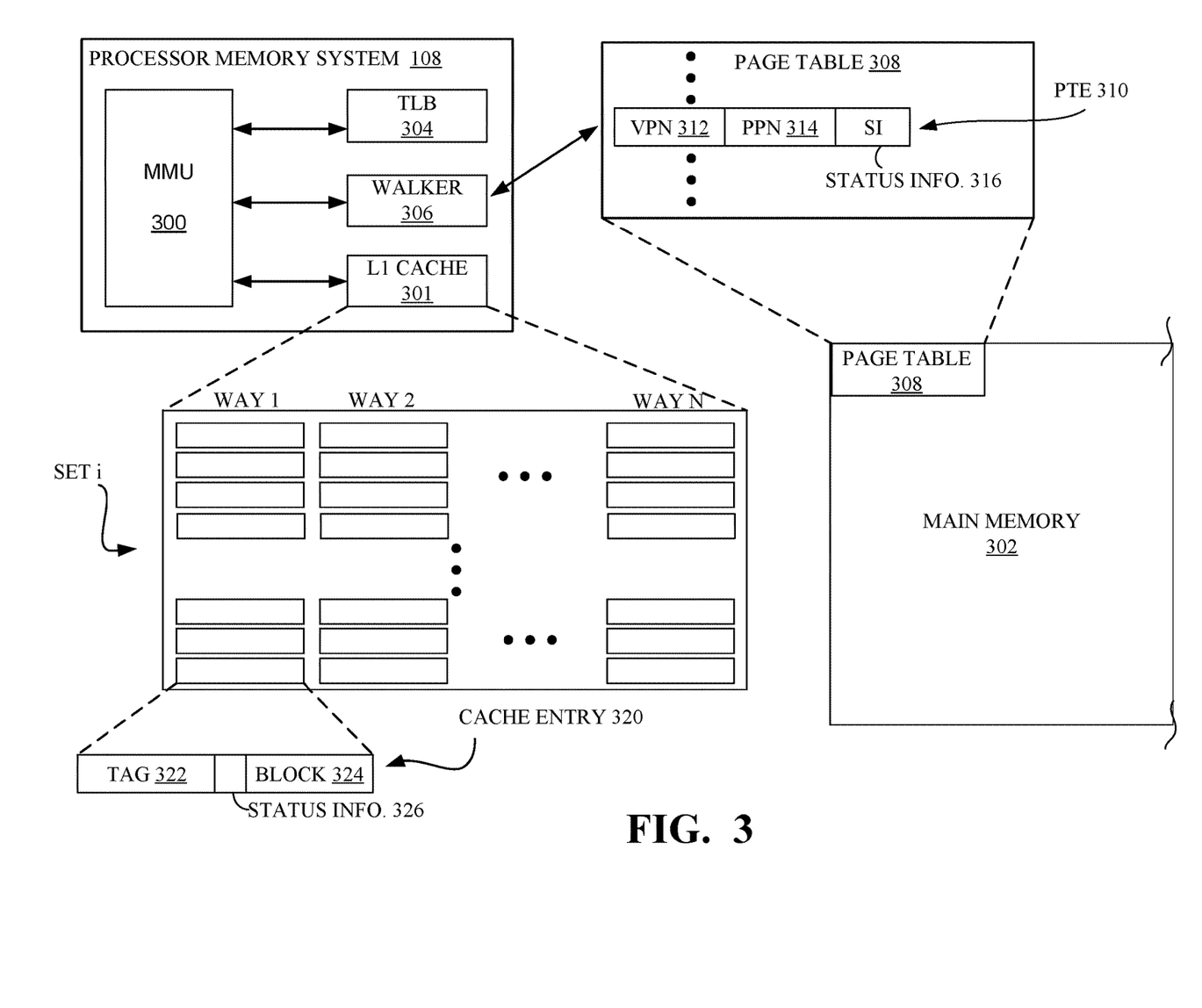
FIG. 3 is an example of a configuration of the processor memory system of FIG. 1.

FIG. 3 is an example of a configuration of the processor memory system 108 of FIG. 1. In example illustrated in FIG. 3, the processor memory system 108 includes a memory management unit (MMU) 300 that manages access to the memory system. The MMU 300 can manage the translation of virtual addresses to physical addresses.

In some implementations, the MMU 300 can determine whether a copy of a stored value (e.g., data or an instruction) at a given virtual address is present in any of the levels of the hierarchical cache system, such as in any of the levels from an L1 cache 301 up to the LLC 120 (FIG. 1) if necessary. If so, then the instruction accessing that virtual address can be executed using a cached copy of the value associated with that address. If not, then that instruction can be handled by miss circuitry to be executed after accessing the value from a main memory 302.

The main memory 302, and potentially one or more levels of the cache system, may need to be accessed using a physical address (PA) translated from the virtual address (VA). To this end, the processor memory system 108 can include a TLB 304 that stores translations, defined by VA-to-PA mappings, and a page table walker 306 for accessing a page table 308 if a translation is not found in the TLB 304. The translations stored in the TLB can include recently accessed translations, likely to be accessed translations, some other types of translations, or a combination thereof.

The page table 308 can store entries, including a page table entry (PTE) 310, that contain all of the VA-to-PA mappings currently in use. The page table 308 can typically be stored in the main memory 302 along with physical memory pages that represent corresponding mapped virtual memory pages that have been "paged in" from secondary storage (e.g., the storage device 118A of FIG. 1).

A memory page can include a number of cache blocks. A cache block can include a number of words. A word is of a predetermined number (e.g., 2) of bytes. A byte is a group of bits (e.g., 8 bits), which can be operated on as a unit. A byte can be considered a unit of memory size.

Alternatively, in a virtualized system with one or more guest operating systems managed by a hypervisor, virtual addresses (VAs) may be translated to intermediate physical addresses (IPAs), which are then translated to physical addresses (PAs). In a virtualized system, the translation by a guest operating system of VAs to IPAs may be handled entirely in software, or the guest operating system may have some hardware assistance from the MMU 300.

The TLB 304 can be used for caching recently accessed PTEs from the page table 308. The caching of recently accessed PTEs can enable the translation to be performed (such as in response to a load or a store instruction) without the page table walker 306 having to perform a potentially multi-level page table walk of a multiple-level data structure storing the page table 308 to retrieve the PTE 310. In an example, the PTE 310 of the page table 308 can store a virtual page number 312 and a physical page number 314, which together serve as a mapping between a VA and a PA that defines a translation of that VA.

An address (i.e., a memory address) can be a collection of bits. The bits of the memory address can be divided into low-order bits and high-order bits. For example, assuming 32-bit addresses, an example of a memory address is 01101001 00101000 00001101 01011100. The low-order bits are the rightmost 16 bits (i.e., 00001101 01011100); and the high-order bit are the leftmost 16 bits (i.e., 01101001 00101000). The low-order bits of a memory address can be used as a page offset. The low-order bits can be identical for a VA and its mapped PA. Thus, the high-order bits of a memory address can be used as a memory page number to specify the mapping.

The PTE 310 can also include status information (SI) 316. The SI 316 can indicate whether or not the page is resident in the main memory 302 or whether the page should be retrieved from secondary storage. When the PTE 310 is stored in an entry of any of the TLB 304, there may also be additional information for managing the transfer of PTEs between the page table 308 and the TLB 304, and for invalidating PTEs in the TLB 304. In an example, invalidating PTEs in the TLB 304 can be accomplished by toggling a bit (that indicates whether the entry is valid or not) to a state (i.e., a binary state) that indicates that the entry is invalid. However, other ways of invalidating PTEs are possible.

If a valid entry in the TLB 304 that matches with a portion of a VA to be translated is found (i.e., a "TLB hit"), then the PTE stored in that entry is used for translation. If there is no match (i.e., a "TLB miss"), then the page table walker 306 can traverse (or "walk") the levels of the page table 308 retrieve a PTE.

The L1 cache 301 can be implemented in any number of possible ways. In the implementation illustrated in FIG. 3, the L1 cache 301 is illustrated as being implemented as an N-way set associative cache module. Each cache entry 320 of the L1 cache 301 can include bits for storing a particular cache block 324 that has been copied from a physical page in the main memory 302 (possibly via higher level cache module).

The cache entry 320 can also include bits for storing a tag 322. The tag 322 can be made up of a number of the most significant bits of a virtual address, which are common to the words of that entry. For a virtually indexed, virtually tagged (VIVT) type of cache module, in addition to comparing a tag portion of a virtual address of desired data, the cache module can compare an index portion of the virtual address (which can be made up of middle bits between the tag and a block offset) to determine which of multiple sets may have a cache entry containing those desired data.

For an N-way set associative cache, the tag comparison can be performed N times (possibly in parallel) for the selected "set" (i). The comparison can be performed once for each of N "ways" in which a cache block containing the desired data may be stored.

The block offset can then be used to select a particular word from a cache block that is found in the cache entry (i.e., a 'cache hit'). If the tag does not match for any of the ways of the selected set (i.e., a 'cache miss'), then the cache system can attempt to retrieve the cache block from a higher level cache or from the main memory 302 (in the case of the LLC). The cache entry 320 can also include bits for storing status information 326. The status information 326 can include, for example, a valid bit and/or any flags or error correction bits.

When establishing a translation from a particular virtual address to a particular physical address or to an intermediate physical address, various types of context information can be used to distinguish otherwise identical virtual addresses from each other. The context information can enable multiple independent virtual address spaces to exist for different processes or different virtual machines or any of a variety of other differentiating characteristics that support different virtual address spaces.

Various portions of the context information can be used for differentiating between virtual addresses that are in use within different VA-to-PA translations, or in the case that intermediate physical addresses (IPAs) are used, VA-to-IPA translations, or IPA-to-PA translations.

For example, an operating system can use an address space identifier (ASID) (e.g., 16 bits) to identify a memory space (a virtual address space) associated with a running process. A hypervisor can use a virtual machine identifier (VMID) (e.g., 16 bits) to identify a memory space (i.e., an intermediate physical address space) associated with a guest operating system of a virtual machine.

Certain parameters can be associated with different classes of processes or software environments that are available in an architecture, such as a security state with values of secure (S) or non-secure (NS), or an exception level (also called a 'priority level') with values of EL0-EL3 (for a 2-bit exception level), for example.

All or a subset of this context information together constitute a context (also called a "translation context" or a "software context") for a particular virtual address.

A context identifier (CID) can represent either the full context information or partial context information. In some architectures, for example, the full context information can include 35 bits: a 2-bit exception level (EL), a 1-bit non-secure/secure (NS/S) value, a 16-bit VMID, and a 16-bit ASID.

It is to be noted, though, that there can potentially be significant overhead in terms of integrated circuit area devoted to the storage for the data structure that tracks validity for different CIDs. To reduce the overhead, the CID can include partial context information, such as only the 16-bit VMID and the 2-bit EL. Such partial context information can uniquely identify different subsets of contexts. Alternatively, instead of simply concatenating subsets of bits from the full context information, techniques can be used to essentially compress full context information into fewer bits. For example, circuitry that computes the CIDs can be configured to include fewer bits than the full context information, where those bits can be assigned based on a stored mapping between CIDs and a corresponding full context information string.

While the mapping itself takes space on the integrated circuit, more space can be saved in the data structure that tracks validity of different active CIDs. Additional details about techniques for compressing context information can be found, for example, in U.S. Pat. No. 9,779,028, entitled "MANAGING TRANSLATION INVALIDATION," which is incorporated herein by reference.

Figure 4:
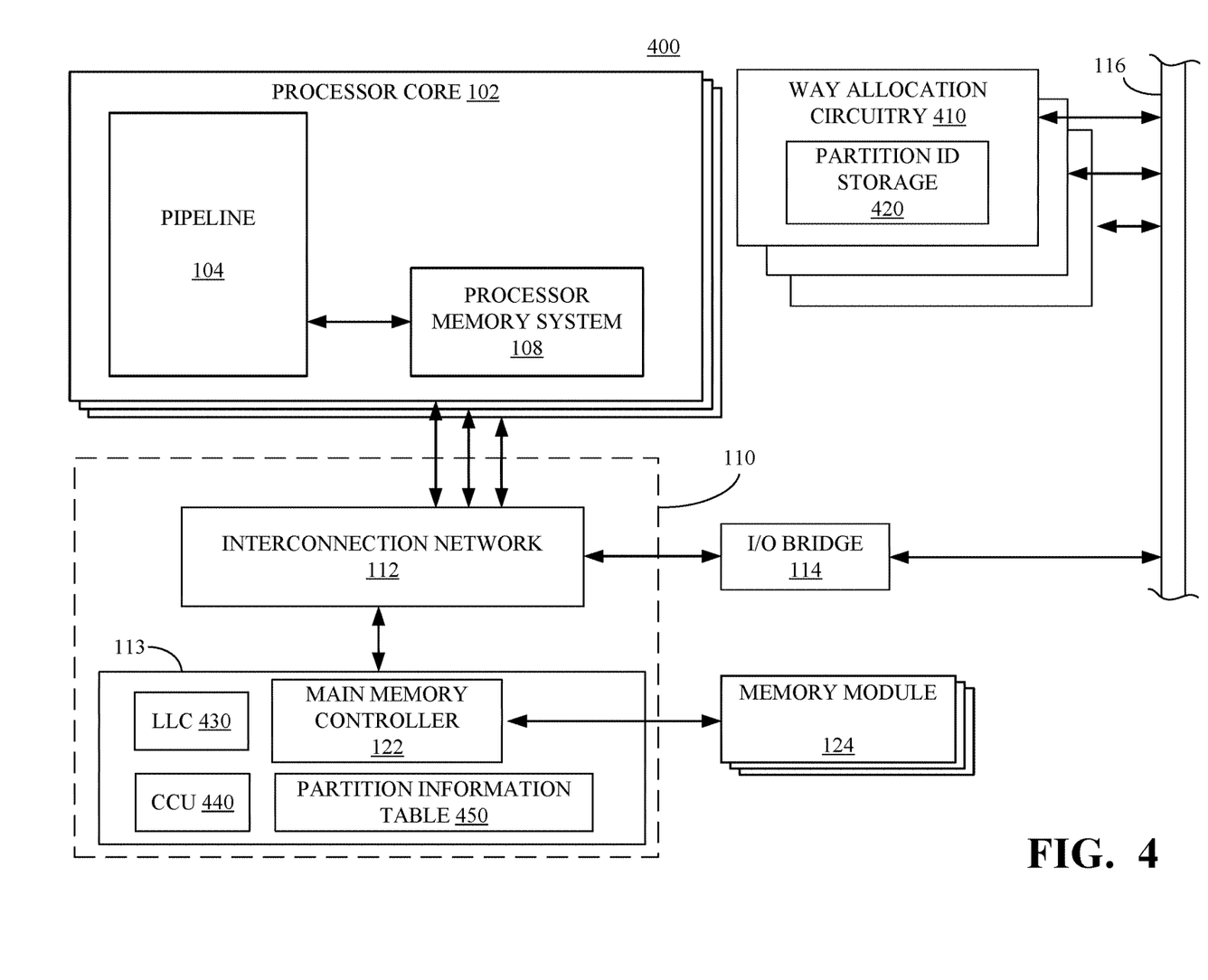
FIG. 4 is an example of a configuration of a computing system for implementing external way allocation circuitry for processor cores.

FIG. 4 is an example of a computing system 400 for implementing external way allocation circuitry for processor cores. The computing system 400 includes the elements and functionality as described for FIGS. 1-3 in addition to the elements and functionality described herein. The processor cores 102 each include a pipeline 104 and a processor memory system 108. The processor cores 102 are in communication with the uncore 110. The uncore 110 includes the interconnection network 112 and the external memory system 113. The interconnection network 112 can enable communication between each processor core 102 and an external memory system 113 and/or an input/output (I/O) bridge 114. In an implementation, the processor memory system 108 and the external memory system 113 can include multiple cache levels as described herein.

The I/O bridge 114 can enable communication, such as over an I/O bus 116, with various different I/O devices including a way allocation circuitry 410 for each of the processor cores 102. The way allocation circuitry 410 can include a respective portion of the circuitry for each processor core that includes a partition ID storage 420. In an implementation, the partition ID storage 420 can be, but is not limited to, a register file. In an implementation, the way allocation circuitry 410 may be a single way allocation circuitry 410 which is accessible by each of the processor cores 102, or different respective hardware modules for each processor core. The way allocation circuitry 410 can be implemented, for example, using logic circuits, firmware, or any combination thereof. In other implementations, the way allocation circuitry 410 can be located in another portion of the computing system 400, such as within the interconnection network 112 or another portion of the uncore 110. The partition ID storage 420 can be populated by the operating system, or other software, executing an instruction (e.g., a store instruction) within the pipeline 104, where the store instruction addresses a portion of an address space that is reserved for accessing the partition ID storage 420.

The partition ID storage 420 can store partition IDs or entity identifiers (EIDs) (as described in patent '299, the entire disclosure of which is hereby incorporated by reference herein) each of which correspond to an entity making a memory request towards a shared cache such as LLC 430. For example, the entity can include, but is not limited to, a process running on one of the processor cores, a virtual machine running on one of the processor cores, an external entity accessing over the I/O bridge 114, and like entities. The entity can include those described in patent '299, the entire disclosure of which is hereby incorporated by reference herein. The size of the partition ID determines the number of entities that can be assigned partitions. For example, an 8-bit partition ID enables 256 entities to have an entry within a partition information table 450 as described herein and in patent '299, the entire disclosure of which is hereby incorporated by reference herein. The partition ID may be generated as described in at least patent '299, the entire disclosure of which is hereby incorporated by reference herein.

The external memory system 113 includes a LLC 430 shared by each of the processor cores, a cache control unit 440, the partition information table 450, and the main memory controller 122. The partition information table 450 can be indexed using the partition IDs and each row of the table includes at least the ways of the LLC 430 assigned to an entity identified by the partition ID. The partition information table 450 can include other information as described in at least patent '299, the entire disclosure of which is hereby incorporated by reference herein.

Operationally, an operating system or other software populates or updates the partition information table 450 with partition IDs, designated ways, and other information, and the partition ID storage(s) 420 with partition IDs at initialization and at any applicable changes such as, for example, a context change, generation of a new virtual machine, addition of new requesting entity, and the like.

In an illustrative example, a requesting entity sends a memory request to the processor memory system 108. The memory request results in a cache miss at the processor memory system 108 and is processed through any applicable intervening caches of the external memory system 113 (e.g., caches at any intermediate level that are applicable in processing the memory request). The way allocation circuitry 410 intercepts the missed memory request prior to processing at the LLC 430 by the CCU 440. The way allocation circuitry 410 reads a partition ID from the partition ID storage(s) 420 based on the requesting entity. The way allocation circuitry 410 attaches the partition ID to the missed memory request. The missed memory request and partition ID is sent to the CCU 440. The CCU 440 uses the partition ID to index the partition information table 450. The CCU 440 determines the designated ways based on the look-up in the partition information table 450. The CCU 440 then proceeds to process the missed memory request with respect to the designated ways in the LLC 430. The CCU 440 returns data associated with the missed memory request if the data is available in the designated ways in the LLC 430. If the data is not available, the CCU 440 can send a request to the main memory controller 122 to obtain the data from the memory module 124.

Figure 5:
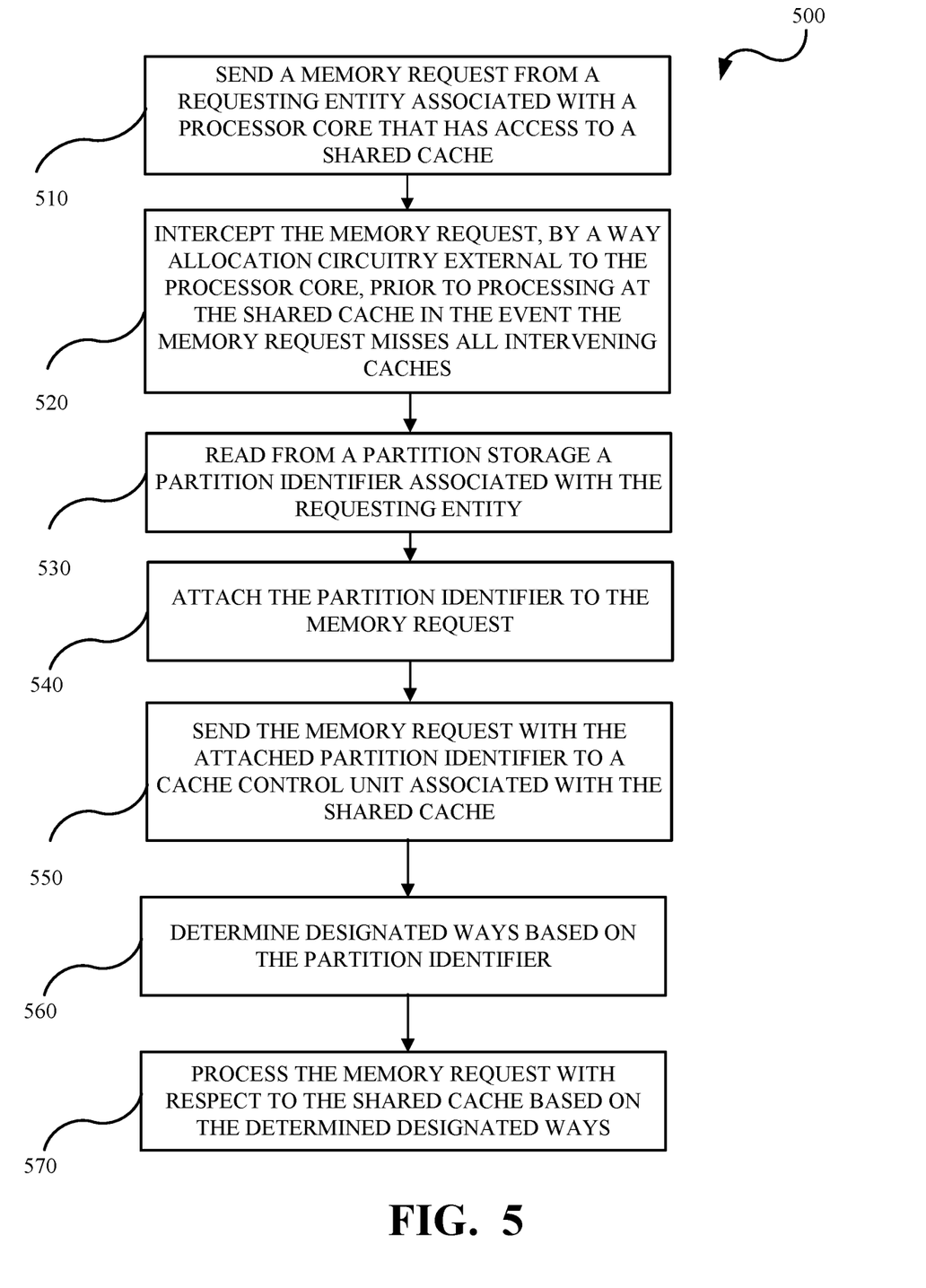
FIG. 5 is a flowchart of an example technique for implementing external way allocation circuitry for processor cores.

FIG. 5 is a flowchart of an example method 500 for implementing external way allocation circuitry for processor cores in accordance with embodiments of this disclosure. The method 500 includes: sending 510 a memory request from a requesting entity associated with a processor core that has access to a shared cache; intercepting 520 the memory request, by a way allocation circuitry external to the processor core, prior to processing at the shared cache in the event the memory request misses all intervening caches; reading 530 from a partition storage a partition identifier associated with the requesting entity; attaching 540 the partition identifier to the memory request; sending 550 the memory request with the attached partition identifier to a cache control unit associated with the shared cache; determining 560 designated ways based on the partition identifier; and processing 570 the memory request with respect to the shared cache based on the determined designated ways. The method 500 may be implemented, as appropriate and applicable, by the computing system 400 of FIG. 4.

The method 500 includes sending 510 a memory request from a requesting entity associated with a processor core which has access to a shared cache. In an implementation, multiple processor cores are connected to or in communication with (collectively "connected to") a shared cache. Each processor core can have multiple entities that can send memory requests. The requesting entities can be the processor core, a process running on a processor core, and the like.

The method 500 includes intercepting 520 the memory request, by a way allocation circuitry external to the processor core, prior to processing at the shared cache in the event the memory request misses all intervening caches. Each of the multiple processor cores can have multiple levels of caches prior to reaching the shared cache. In the event that none of the caches have the data in the memory request, the memory request is directed to the shared cache. Each of the multiple processor cores are associated with a way allocation circuitry external to the processor core. That is, the way allocation circuitry is connected to the processor via an input/output (I/O) interface or similar interface connector. In an implementation, the way allocation circuitry and the processor core are on different chips or die. The way allocation circuitry intercepts or otherwise receives the memory request prior to receipt by a cache control unit associated with the shared cache. In an implementation, the multiple processor cores can share a way allocation circuitry using multiplexing or other like techniques.

The method 500 includes reading 530 from a partition storage a partition identifier associated with the requesting entity. The way allocation circuitry includes one or more storage areas for storing partition identifiers. The partition identifiers identify a processor core, a process running on a processor core, and like requesting entities. The storage areas are populated and updated by software or an operating system at initialization or events generating updates such as a context switch. Upon receipt of the memory request, the way allocation circuitry reads the partition identifier from the storage area based on the requesting entity.

The method 500 includes attaching 540 the partition identifier to the memory request. After reading the partition identifier from the storage area, the way allocation circuitry attaches the partition identifier to the memory request. In an implementation, the way allocation circuitry may generate a new message with both the memory request and the partition identifier. In an implementation, the way allocation circuitry can concatenate the partition identifier to the memory request.

The method 500 includes sending 550 the memory request with the attached partition identifier to a cache control unit associated with the shared cache. After attachment of the partition identifier to the memory request, the way allocation circuitry sends the memory request and the partition identifier to a cache control unit associated with the shared cache.

The method 500 includes determining 560 designated ways based on the partition identifier. The cache control unit uses the partition identifier to index a partition information table stored in memory accessible by the cache control unit. The partition information table is populated and updated by software or an operating system at initialization or events generating updates such as a context switch. The partition information table includes multiple rows which each have a partition identifier (which is used as an index into the partition information table), designated ways for the entity associated with the partition identifier, and other partition information.

The method 500 includes processing 570 the memory request with respect to the shared cache based on the determined designated ways. The cache control unit uses the determined designated ways to determine if the data needed by the memory request is present in the designated ways in the shared cache. The data is forwarded if present in the designated ways of the shared cache. The data is requested from the main memory via the main memory controller if the data is not present in the designated ways of the shared cache.

For simplicity of explanation, the technique 500 is depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of external way allocation circuitry for processor cores (and the algorithms, methods, instructions, etc., stored thereon and/or executed thereby, including by the external way allocation circuitry) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for memory management, the method comprising:
sending a memory request from a requesting entity, the requesting entity being at least one of at least one processor core of a plurality of processor cores that have access to a shared cache or a process running on the at least one processor core;
intercepting the memory request, by way allocation circuitry, prior to processing at the shared cache in the event the memory request misses all applicable intervening caches, the way allocation circuitry external to the plurality of processor cores;
reading from a partition storage, by the way allocation circuitry, a partition identifier for the requesting entity, the partition storage located with the way allocation circuitry and the partition storage populated with partition identifiers by at least one instruction executed within a pipeline associated with the requesting entity, the instruction addressing a portion of an address space reserved for accessing the partition storage;
attaching, by the way allocation circuitry, the partition identifier to the memory request;
sending, by the way allocation circuitry, the memory request with the attached partition identifier to a cache control unit associated with the shared cache;

determining, by the cache control unit from a partition information table, designated ways in the shared cache based on the partition identifier; and processing the memory request with respect to the determined designated ways in the shared cache.

2. The method of claim 1, wherein the partition information table is populated with at least partition identifiers and designated ways by the instruction.

3. The method of claim 2, wherein the instruction populates the partition storage and the partition information table at initialization.

4. The method of claim 3, wherein the instruction updates the partition storage and the partition information table at defined events.

5. The method of claim 4, wherein the partition identifier is an index in the partition information table.

6. The method of claim 5, wherein each processor core has an associated way allocation circuitry.

7. The method of claim 6, wherein the way allocation circuitry is on a die separate from a processor core die.

8. The method of claim 6, wherein the way allocation circuitry is on a chip separate from a processor core chip.

9. The method of claim 5, wherein the way allocation circuitry is shared by the plurality of processor cores.

10. An apparatus comprising:
a plurality of processor cores;
a shared cache connected to the plurality of processor cores;
a partition storage populated with partition identifiers by one of a software or an operating system;
a cache control unit connected to the shared cache; and
way allocation circuitry connected to at least one of the plurality of processor cores, the way allocation circuitry external to the plurality of processor cores, the cache control unit and the way allocation circuitry cooperatively configured to
process an intercepted memory request with respect to designated ways in the shared cache, the designated ways being based on a partition identifier and a partition information table, the partition information table populated with at least partition identifiers and designated ways by the one of a software or an operating system;
wherein the way allocation circuitry is further configured to intercept a memory request prior to processing at the shared cache when the memory request misses all applicable intervening caches, the memory request sent by a requesting entity associated with at least one processor core of the plurality of processor cores;
wherein the requesting entity is at least one of the at least one processor core or a process running on the at least one processor core, and the requesting entity has a partition identifier; and
wherein the one of a software or an operating system populates the partition storage and the partition information table at initialization and wherein the one of a software or an operating system updates the partition storage and the partition information table at defined events.

11. The apparatus of claim 10, wherein the partition identifier is an index in the partition information table.

12. The apparatus of claim 11, wherein each processor core has an associated way allocation circuitry.

13. The apparatus of claim 12, wherein the way allocation circuitry is on a die separate from a processor core die.

14. An apparatus comprising:
a plurality of processor cores;
a shared cache connected to the plurality of processor cores;
a cache control unit connected to the shared cache; and
way allocation circuitry connected to at least one of the plurality of processor cores, the way allocation circuitry external to the plurality of processor cores, the cache control unit and the way allocation circuitry cooperatively configured to:
intercept a memory request prior to processing at the shared cache when the memory request misses all applicable intervening caches, the memory request sent by a requesting entity that is at least one of at least one processor core of the plurality of processor cores or a process running on the at least one processor core;
read from a partition storage a partition identifier for the requesting entity, the partition storage located with the way allocation circuitry and the partition storage populated with partition identifiers by at least one instruction executed within a pipeline associated with the requesting entity, the instruction addressing a portion of an address space reserved for accessing the partition storage;
attach the partition identifier to the memory request; and
send the memory request with the attached partition identifier to the cache control unit; and
the cache control unit configured to:
determine from a partition information table, designated ways in the shared cache based on the partition identifier; and
process the memory request with respect to the determined designated ways in the shared cache.

15. The apparatus of claim 14, wherein the partition information table is populated with at least partition identifiers and designated ways by the instruction.

16. The apparatus of claim 15, wherein the instruction populates the partition storage and the partition information table at initialization.

17. The apparatus of claim 16, wherein the instruction updates the partition storage and the partition information table at defined events.

18. The apparatus of claim 17, wherein the partition identifier is an index in the partition information table.

19. An apparatus comprising:
a plurality of processor cores;
a shared cache connected to the plurality of processor cores;
a partition storage populated with partition identifiers by one of a software or an operating system;
means for cache control connected to the shared cache; and
means for way allocation connected to at least one of the plurality of processor cores, the means for way allocation external to the plurality of processor cores, the means for cache control and the means for way allocation cooperatively configured to process an intercepted memory request with respect to designated ways in the shared cache, the designated ways being based on a partition identifier and a partition information table, the partition information table populated with at least partition identifiers and designated ways by the one of a software or an operating system;
wherein the means for way allocation is further configured to intercept a memory request prior to processing at the shared cache when the memory request misses all applicable intervening caches, the memory request sent by a requesting entity associated with at least one processor core of the plurality of processor cores;

wherein the requesting entity is at least one of the at least one processor core or a process running on the at least one processor core, and the requesting entity has a partition identifier; and wherein the one of a software or an operating system populates the partition storage and the partition information table at initialization and wherein the one of a software or an operating system updates the partition storage and the partition information table at defined events.

20. The apparatus of claim 19, wherein the partition identifier is an index in the partition information table.

21. The apparatus of claim 20, wherein each processor core has an associated way allocation circuitry.

22. The apparatus of claim 21, wherein the means for way allocation is on a die separate from a processor core die.

\* \* \* \* \*